United States Patent [19]

Inoue et al.

[11] Patent Number: 5,025,499
[45] Date of Patent: Jun. 18, 1991

[54] PROCESS CONTROL METHOD AND CONTROL SYSTEM

[75] Inventors: Haruki Inoue, Katsuta; Motohisa Funabashi, Sagamihara; Masakazu Yahiro, Hitachi; Fumiki Tanaka, Ebetsu, all of Japan

[73] Assignees: Hitachi, Ltd., Tokyo; Hitachi Engineering Co., Ltd., Ibaraki, both of Japan

[21] Appl. No.: 336,797

[22] Filed: Apr. 12, 1989

[30] Foreign Application Priority Data

Apr. 13, 1988 [JP] Japan .................................. 63-89077

[51] Int. Cl.$^5$ .............................................. G05B 13/02
[52] U.S. Cl. ..................................... 364/165; 364/513
[58] Field of Search ........ 364/131, 148, 152, 160–165, 364/807, 513

[56] References Cited

U.S. PATENT DOCUMENTS

| | | | |
|---|---|---|---|
| 4,777,585 | 10/1988 | Kokawa et al. | 364/164 |
| 4,860,213 | 8/1989 | Bonissone | 364/513 |
| 4,864,490 | 9/1989 | Nomoto et al. | 364/157 |
| 4,882,526 | 11/1989 | Iino et al. | 318/561 |
| 4,903,192 | 2/1990 | Saito et al. | 364/157 |

OTHER PUBLICATIONS

*EDN Electrical Design News*, vol. 32, No. 8, "Fuzzy Logic Allows Creation of Precise Process Controller", pp. 201–204, Newton, 15 Apr. 87.
*Patent Abstracts of Japan*, vol. 11, No. 72, 05 Mar. 87.
*Proceedings of the 1985 American Control Conference*, "Design and Experimental Evaluation of a Fuzzy System for the Control of Reactor Power", Bernard et al., pp. 1466–1474, 21 Jun. 1985.
"A Qualitive Physics Based on Confluences", Artificial Intelligence 24, 1, pp. 7–83, 1984.

*Primary Examiner*—Jerry Smith
*Assistant Examiner*—Paul Gordon
*Attorney, Agent, or Firm*—Antonelli, Terry, Stout & Kraus

[57] ABSTRACT

A process control system for controlling actions of a process is provided as a qualitative model to which the fuzzy theory is applied to infer and control the process. The process control system includes differentiation apparatus for determining the amounts of displacement of different process amounts with respect to time, qualitative fuzzy inference apparatus for making inference of qualitative process actions, and centroid arithmetic apparatus for converting the qualitative values of inferred control target process amounts into the appropriate amount of control.

7 Claims, 17 Drawing Sheets

QUALITATIVE LOGIC PRODUCT INFERENCE UNIT

QUALITATIVE LOGIC SUM INFERENCE UNIT

FIG. 9

DEFINITION OF QUALITATIVE LOGIC PRODUCT INFERENCE RULE

| rule | if (CONDITION) | | | | | | then (CONCLUSION) | | |
|---|---|---|---|---|---|---|---|---|---|
| | $\partial X$ | | | $\partial Y$ | | | $\partial X \cdot \partial Y$ | | |
| | + | 0 | − | + | 0 | − | + | 0 | − |
| 1 | ✓ | | | ✓ | | | ✓ | | |
| 2 | ✓ | | | | ✓ | | | ✓ | |
| 3 | ✓ | | | | | ✓ | | | ✓ |
| 4 | | ✓ | | ✓ | | | | ✓ | |
| 5 | | ✓ | | | ✓ | | | ✓ | |
| 6 | | ✓ | | | | ✓ | | ✓ | |
| 7 | | | ✓ | ✓ | | | | | ✓ |
| 8 | | | ✓ | | ✓ | | | ✓ | |
| 9 | | | ✓ | | | ✓ | ✓ | | |

FIG. 10

DEFINITION OF QUALITATIVE LOGIC SUM INFERENCE RULE

| rule | if (CONDITION) | | | | | | then (CONCLUSION) | | |
|---|---|---|---|---|---|---|---|---|---|
| | $\partial X$ | | | $\partial Y$ | | | $\partial X + \partial Y$ | | |
| | + | 0 | − | + | 0 | − | + | 0 | − |
| 1 | ✓ | | | ✓ | | | ✓ | | |
| 2 | ✓ | | | | ✓ | | ✓ | | |
| 3 | ✓ | | | | | ✓ | ✓ | | |
| 4 | | ✓ | | ✓ | | | ✓ | | |
| 5 | | ✓ | | | ✓ | | | ✓ | |
| 6 | | ✓ | | | | ✓ | | | ✓ |
| 7 | | | ✓ | ✓ | | | | ✓ | |
| 8 | | | ✓ | | ✓ | | | | ✓ |
| 9 | | | ✓ | | | ✓ | | | ✓ |

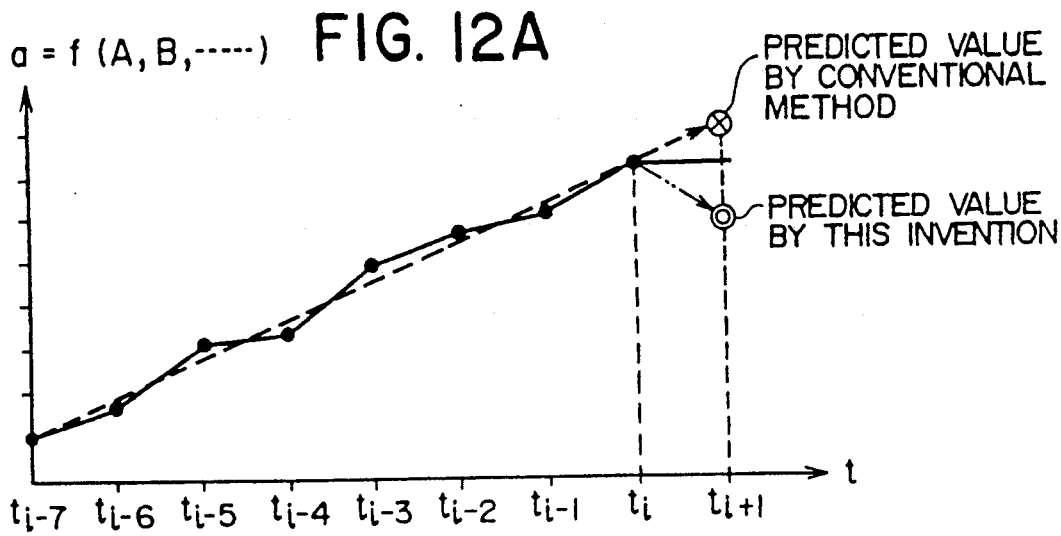
FIG. 12A
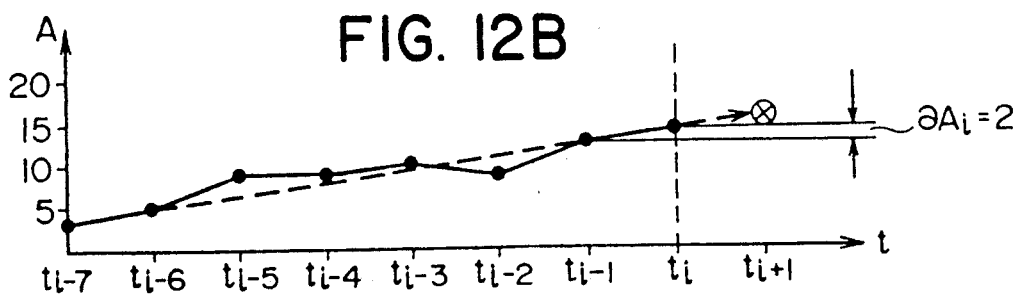
FIG. 12B
FIG. 12C
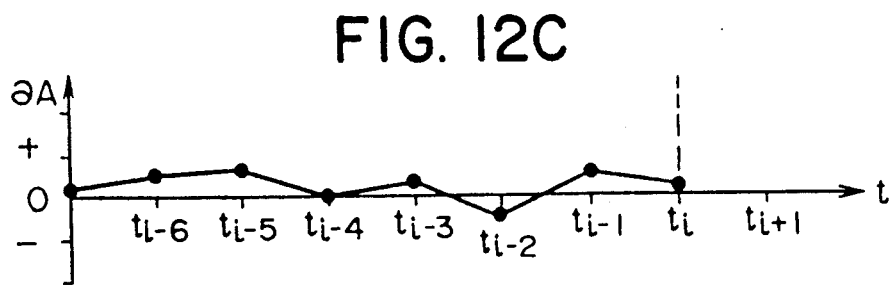
FIG. 12D
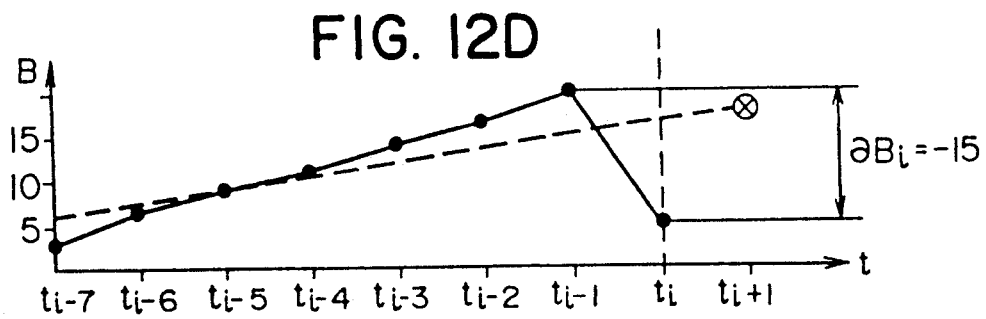
FIG. 12E
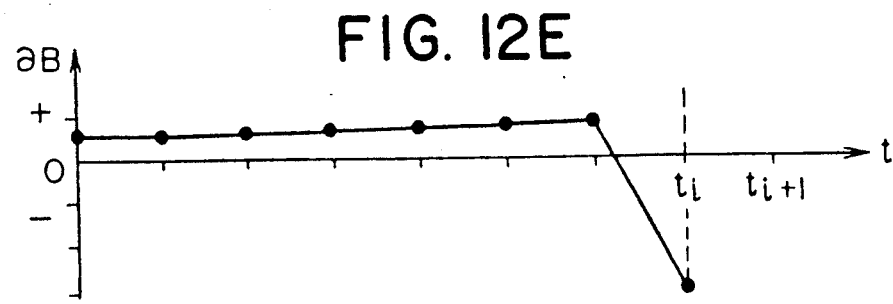

FIG. 20

$\partial X \cdot \partial Y$     $\partial X \rightarrow$

| $\partial Y$ | − | o | + |
|---|---|---|---|
| − | + | o | − |
| o | o | o | o |
| + | − | o | + |

FIG. 21

$\partial X + \partial Y$     $\partial X \rightarrow$

| $\partial Y$ | − | o | + |
|---|---|---|---|
| − | − | − | o |
| o | − | o | + |
| + | o | + | + |

PROCESS CONTROL METHOD AND CONTROL SYSTEM

BACKGROUND OF THE INVENTION

This invention relates to a process control method and control system using the fuzzy theory.

In the conventional process control, the transition of the amount of a process to be controlled after lapse of unit time is predicted by the observation of the past trend of time-sequential change of different amount of process and by the method of least squares and used to determine the amount of control for the amount of process. Also, as is disclosed in, for example, Japanese Patent Laid-open Gazette No. 204707/1984 and No. 234405/1986, another conventional process control is proposed which employs the fuzzy theory for inferring the situations of process and determining the amount of control by evaluating the measured values from different process-amount sensors on the basis of operator's transcendental information.

The former conventional process control only makes the next prediction in a time-sequential manner, and the latter conventional process control determines the amount of control by the evaluation based on the transcendental information relative to absolute amount. Therefore, these conventional process control methods have the drawback that the control cannot follow an abrupt change of local primary factors associated with the process action.

On the other hand, the qualitative inference researched by J. de Kleen et al. has recently been given attention as one method of providing a model for a human to understand the phenomena in the natural world (see "Qualitative Physics Based on Confluences" J. de Kleer and J. S. Brown, Artificial Intelligence 24, 1, pp. 7–83, 1984). In this qualitative inference, three values of $+$, $0$, $-$ called qualitative values, not quantative values are used. The variable is called as the qualitative variable designated by $[X]$. Also, the differentiation $dx/dt$ to be used for expressing the action of a system is represented by $\partial X$ and takes three values $+$, $0$, $-$ as does the variable $[X]$. Since a quantative equation is normally given, it must be converted into a qualitative equation. For example, the amount of flow, Q from the outlet of a tube having a cross-section A and an outflow coefficient C is expressed as $$Q = CA\sqrt{2P/\rho}, \; P > 0$$

where P is the pressure and $\rho$ is the volume density of liquid. If C and $\rho$ are constants, the differentiation of this equation is given as $$\frac{dQ}{dt} = C\sqrt{\frac{2P}{\rho}} \cdot \frac{dA}{dt} - CA\frac{1}{\sqrt{2P\rho}} \frac{dP}{dt}$$

These two quantative equations are converted into the following qualitative equations.

$$[Q] = [C][A][\sqrt{2P\rho}]$$
$$= [+][-][\sqrt{2P\rho}]$$
$$= [P]$$

$$\partial Q = [C][\sqrt{2P\rho}]\partial A + [C][A][\sqrt{1/2P\rho}]\partial P$$
$$= [P]\partial A - [A][P]\partial P$$

When P or A makes absolute displacement relative to a constant (landmark, which will be described later) to achieve a qualitative value, this equation becomes a differential equation. In this example, however, since P and A can be considered to be constants having positive qualitative values, the expression of $$\partial Q = \partial A + \partial P$$

can be obtained.

The process to solve a qualitative equation is the qualitative inference and comprises an operation called propagation for assigning a qualitative value to the qualitative variable at a time point and an operation called a prediction for determining the next condition. In most cases, the qualitative values of the qualitative variable take three or more intervals relative to some constants called landmark. When a set of intervals covering real number space $(I_0, I_1, I_3 \ldots I_m)$ is represented by Q, the qualitative variable is expressed by $[X]_Q$, and takes the following values.

$$[X]_Q = \begin{cases} I_0, X = I_0 \\ I_1, X = I_1 \\ \cdot \\ \cdot \\ \cdot \\ X_m, X = I_m \end{cases}$$

When the landmark is only a, $$[X]_a = \begin{cases} X > a \\ X = a \\ X < a \end{cases}$$

When $a=0$, the affix is omitted as $$[X] = \begin{cases} +, X > 0 \\ 0, X = 0 \\ -, X < 0 \end{cases}$$

"$+$" can be considered as the name of the interval, $X>0$. For realization of system, in most cases, states for each landmark are considered, or the form of $[X-a]$ is reduced to and three values $(+, 0, -)$ are used in calculation.

The method of calculation using qualitative values $(+, 0, -)$ is shown in FIGS. 20 and 21. The propagation is made by determining the valuable within the qualitative equation on the basis of the figures. The prediction is performed on the basis of $$[X(t_n)] = [X(t_{n-1}) + \partial X(t_{n-1})]$$

It is uncertain how many times $\partial X$ of "$+$" is added to one having qualitative value "$-$" to reach "0" or "$+$".

Thus, the individual problems must be considered for the determination.

This qualitative reasoning is still at the research stage, and no approaches are established in many aspects such as way to make equations, control of inference and execution of computation. Therefore, it is difficult for the qualitative inference to be applied to practical models.

SUMMARY OF THE INVENTION

Accordingly, it is an object of this invention to provide a process control method and control system which are able to control with high precision even under sudden changes in local factors of process.

It is another object of this invention to provide an approach for inferential control of qualitative differential equations of which the actions of process are simulated.

Still other objects of this invention will be obvious from the following description.

According to this invention, there is provided a process control and control system which handle the actions of process or local actions of process as qualitative models and apply qualitative fuzzy theory to these models. In this process control and control system, different quantative or qualitative process information (including intermediate inferred values) or qualitative evaluation of the amount of time displacement resulting from differentiating this process information with respect to time is previously evaluated qualitatively on the basis of fuzzy amount to produce appropriate values of membership function, a set of qualitative evaluation appropriate values of future (unit time later) control target process information is experientially inferred on the basis of the qualitative evaluation of the appropriate values, and the amount of the process control is determined by centroid computation of the membership function and the set of qualitative evaluation appropriate values of the control target information.

Thus, since the appropriate values are evenly evaluated according to the transcendental information such as the membership function and experiential rules even if different kinds of information and the amount of change with respect to time have different dimensions, the actions of the amount of process after unit time can be inferred. Consequently, it is possible to treat even the local and sudden changes of process, and thus to improve the accuracy of prediction to a great extent so that the amount of control can be determined to be an optimum value.

BRIEF DESCRIPTION OF THE DRAWINGS

FIGS. 2 to 5 are detailed diagrams of elements of FIG. 1, wherein FIG. 2 shows the differentiation apparatus, FIG. 3 shows the qualitative inference apparatus, FIG. 4 shows the qualitative logic product inference apparatus and FIG. 5 shows the qualitative logical sum inference apparatus.

FIGS. 7A-C is a graph showing the change of amount of process with respect to time.

FIG. 9 shows a table of definitions of qualitative logic product inference rule.

FIG. 10 shows a table of definitions of qualitative logic sum inference rule.

FIGS. 12A-E is graphs showing the effects of this invention.

FIGS. 16 to 19 are diagrams useful for explaining still another embodiment of this invention; FIG. 16 shows the differentiation apparatus for tunnel ventilation process amount, FIG. 17 shows the qualitative inference apparatus for pollution within tunnel.

FIGS. 20 and 21 are inference rule matrix diagrams useful for the idea of qualitative inference.

DESCRIPTION OF THE PREFERRED EMBODIMENTS

Figure 1:
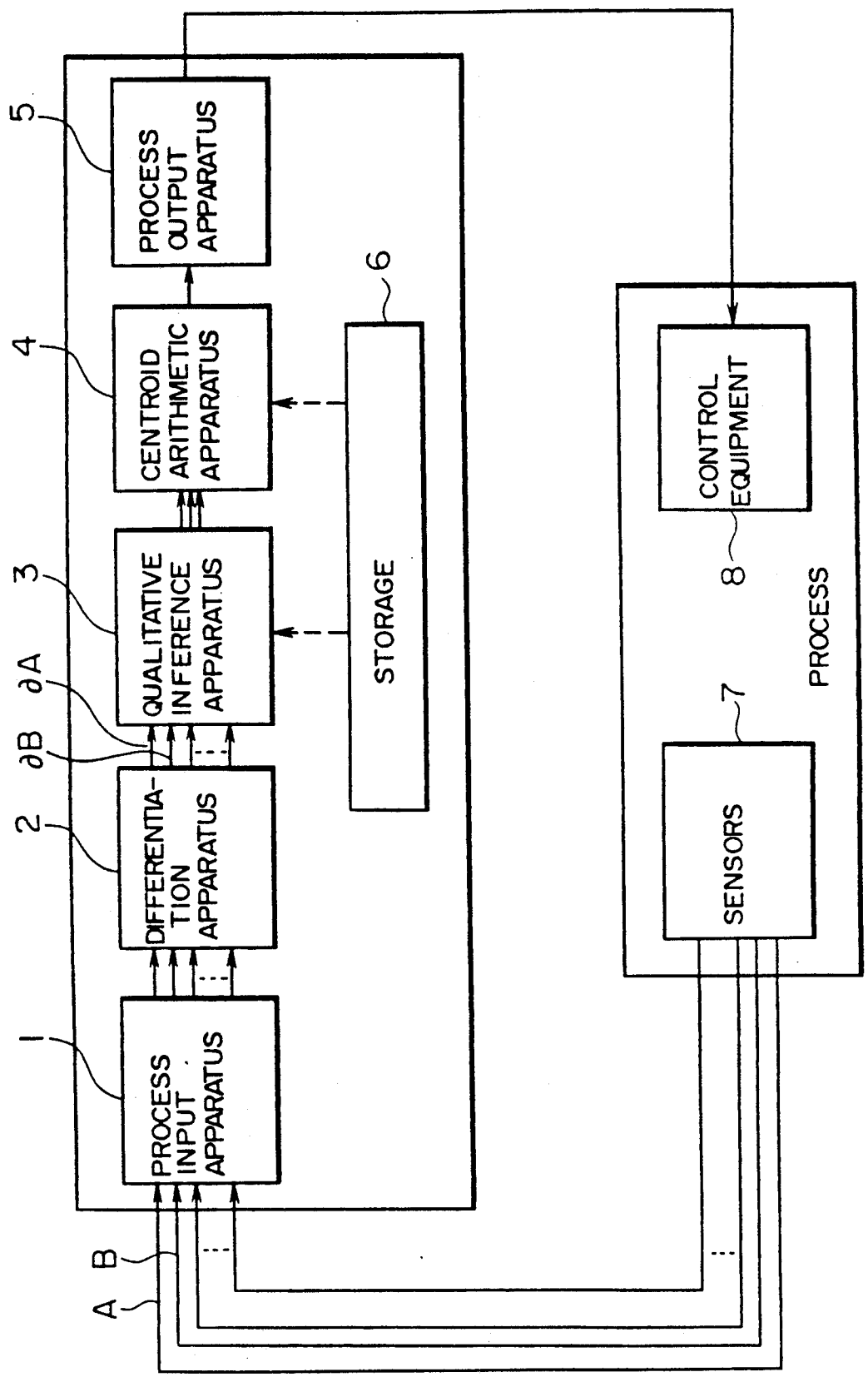
FIG. 1 is a block diagram of one embodiment of a control system of this invention.

One embodiment of this invention is shown in FIG. 1.

Referring to FIG. 1, there are shown a control equipment 8 for controlling processes and a great number of different sensors 7 for measuring the amounts of different processes. The control equipment 8 and the sensors 7 are provided to control related processes. The sensors 7 produce many different measured values, but for convenience of explanation, two different measured values A and B are handled here. The different measured values A and B of process amount are supplied to a process input apparatus 1 and then to a differentiation apparatus 2. The differentiation apparatus 2 has a memory for storing the amounts of process, and calculates the amount of change of A, B per unit time $(t_{i-1} - t_i)$ on this memory. The amounts of change with respect to time are represented by $\partial A$, $\partial B$, respectively. Shown at 3 is a qualitative inference apparatus 3 which receives the differentiated values $\partial A$ and $\partial B$ (amounts of change with respect to time) of the measured values A and B, evaluates their appropriate values on the basis of the membership function resulting from previously evaluating the amount of change $\partial A$ and $\partial B$ stored in a memory 6 on the fuzzy amount, and infers the appropriate values of control target process amount after unit time $t_{i+1}$ from those appropriate values. Shown at 4 is a centroid arithmetic apparatus for determining the amount of control on the basis of the inferred appropriate values and transcendental control amount evaluation information which is stored in the memory 6 and supplied to the control equipment 8. The determined control amount is supplied from a process output unit 5 to the control equipment 8. Such a control operation is performed at every unit time to control processes.

Figure 2:
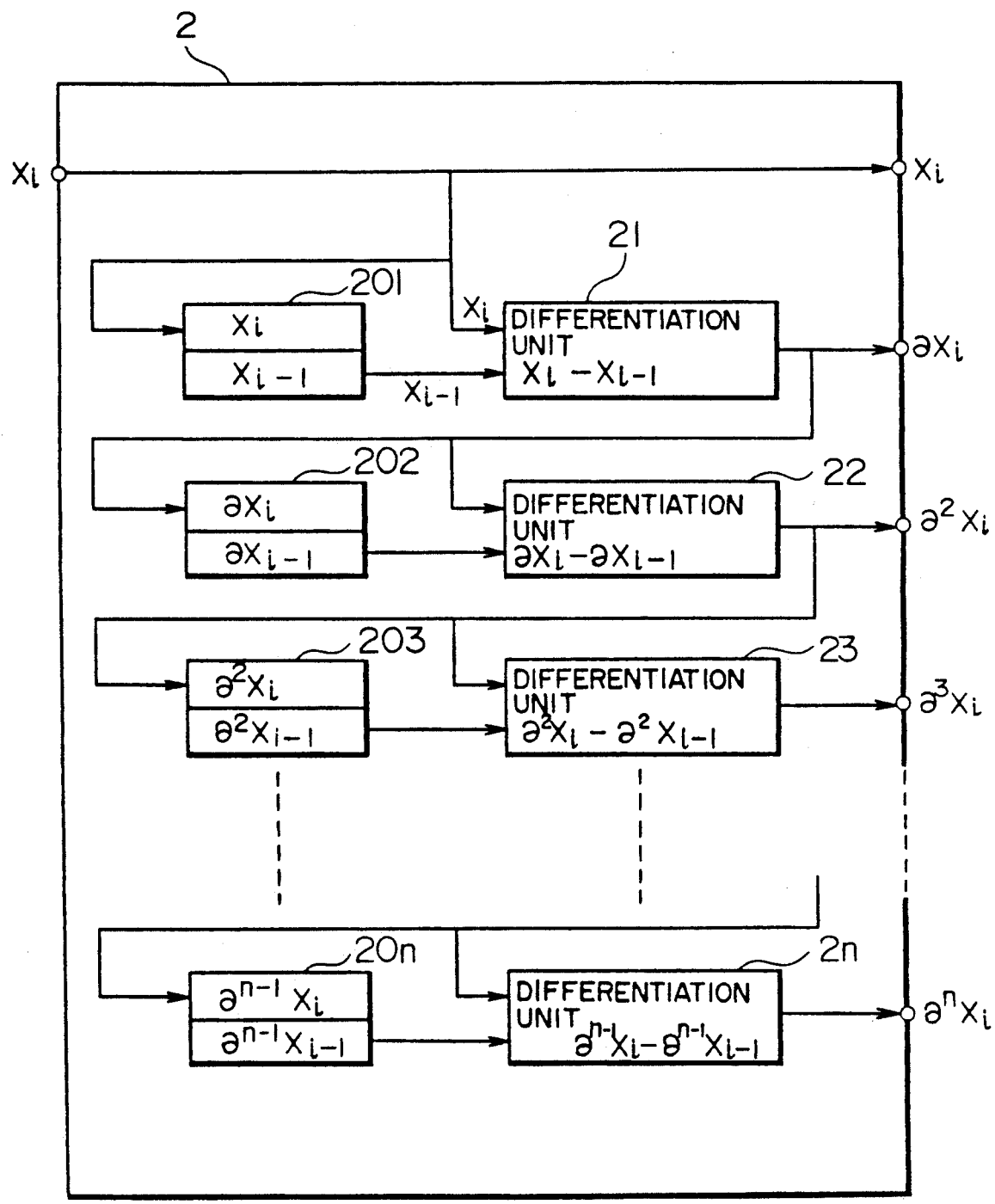

FIG. 2 shows the construction of one example of the differentiation apparatus 2. In FIG. 2, reference character $X_i$ indicates the amount of process (A or B) measured by the sensor 7 at time i. The differential apparatus 2 receives the measured value $X_i$ and produces the first-order differentiated value $\partial X_i$, second-order differentiated value $\partial^2 X_i$, ... $n_{th}$-order differentiated value $\partial^n X_i$, where $\partial^n X$ represents the amount of change of $\partial^{n-1}X$ with respect to time. The differentiation apparatus 2 has n differentiation units 21, 22, ... 2n connected in cascade with memories 201, 202, ... 20n in order to produce nth-order differentiated value. The storage 5 makes shift register operation and stores the value $\partial^n X_{i-1}$ calculated at time i−1 and the value $\partial^n X_i$ calculated at time i in each differentiation unit.

Figure 3:
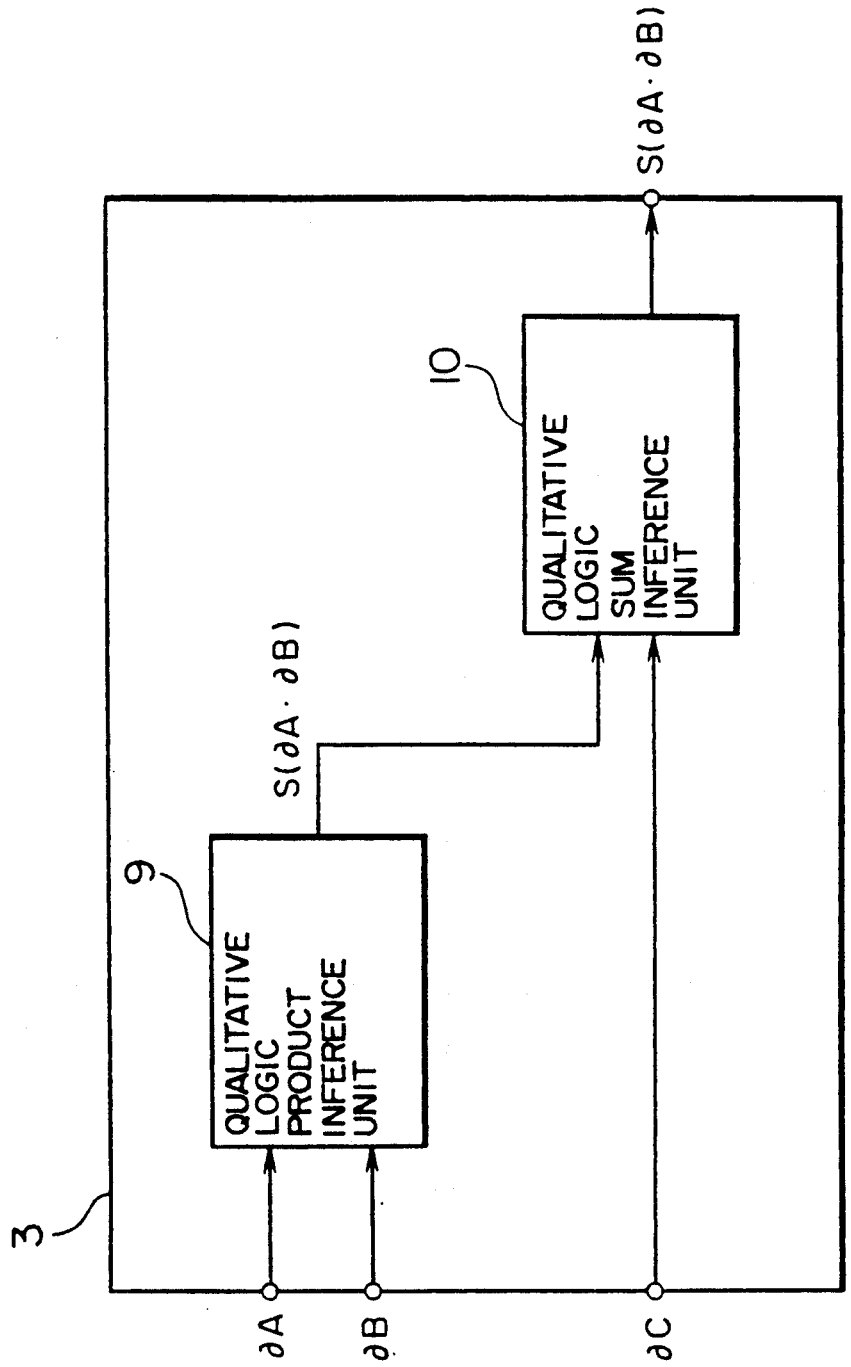
Figure 4:
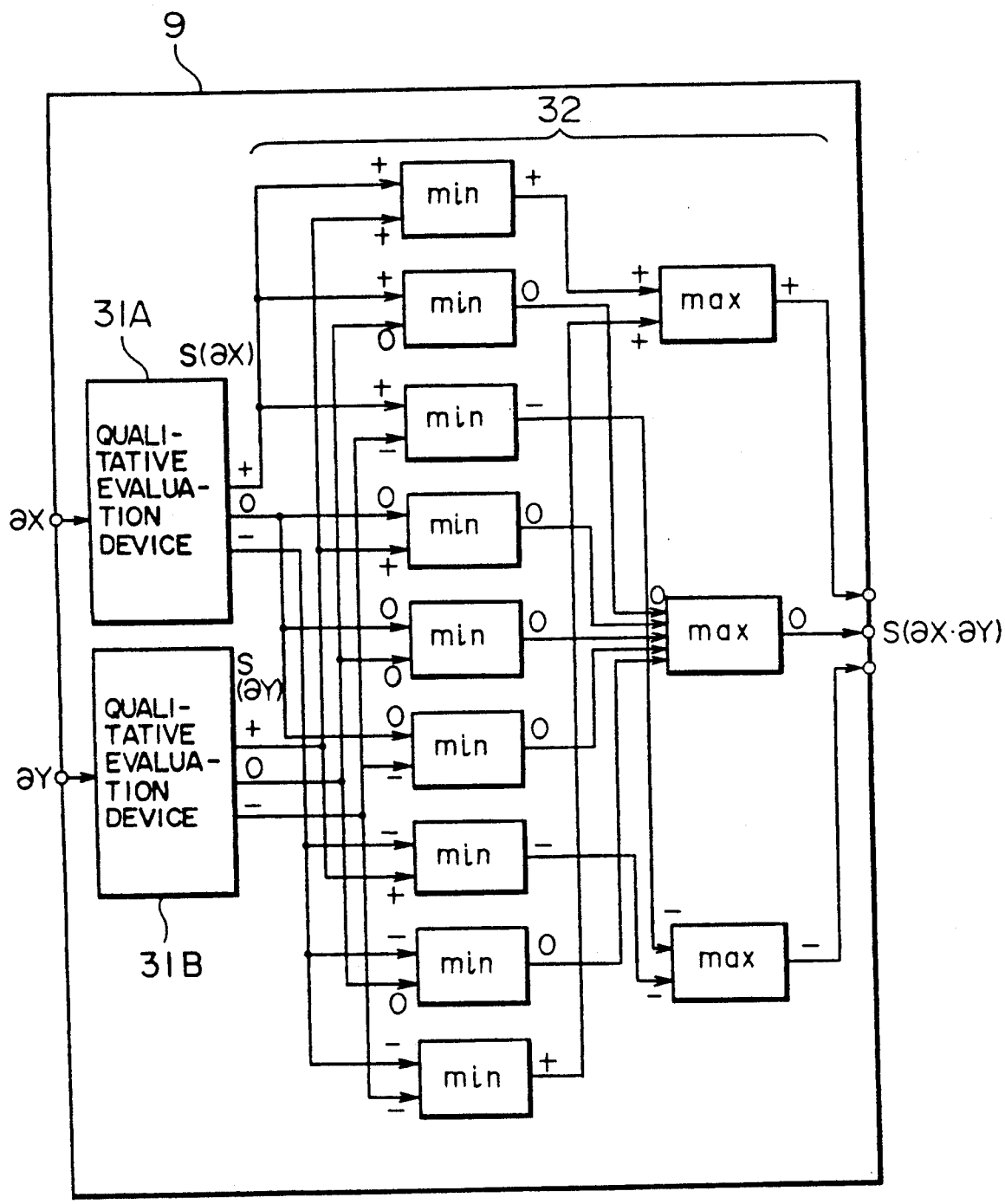
Figure 5:
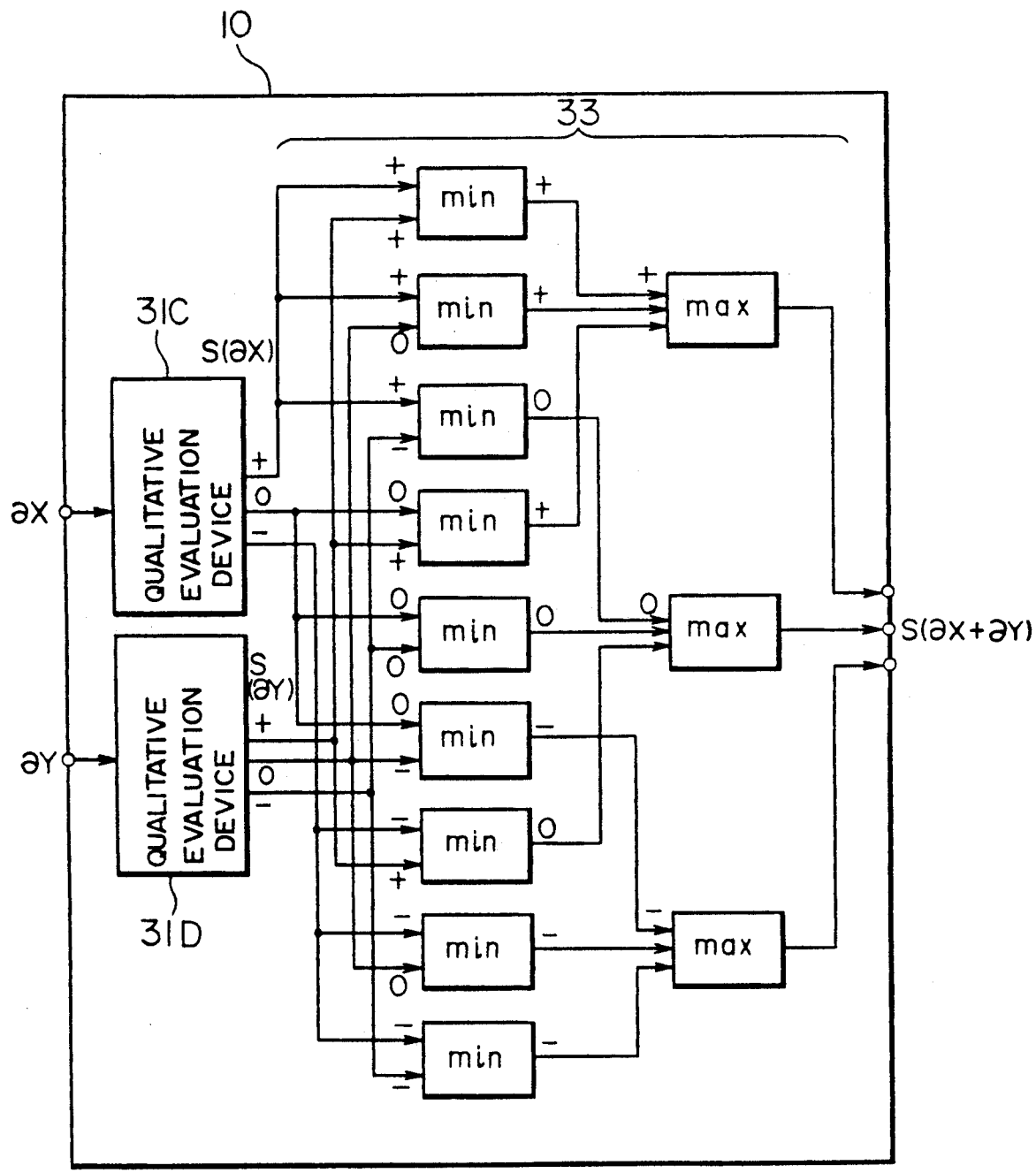

FIG. 3 shows the construction of the qualitative inference apparatus 3. The qualitative inference apparatus 3 comprises a qualitative logic product inference unit 9 for the process simulating qualitative differentiation equations of which the qualitative variables have a product relation and a qualitative logic sum inference unit 10 for the qualitative variables having a sum relation. FIG. 3 shows the case where the control target process amount is inferred by the differentiated value $\partial A$, $\partial B$, $\partial C$ of different process amounts A, B, C measured by the sensors 7. The qualitative logic product inference unit is constructed as shown in FIG. 4. The amounts of change $\partial X$, $\partial Y$ are the differentiated values of process amounts X, Y measured by the sensors 7. The qualitative logic product inference unit 9 comprises appropriate value qualitative evaluation devices 31A, 31B which receive the amounts of change $\partial X$, $\partial Y$ and evaluate the degrees of the changes qualitatively, and a qualitative product inference device 32 employing the min-max method of fuzzy theory, and produces a qualitative product evaluation set S ($\partial X$, $\partial Y$) of the amounts of change $\partial X$, $\partial Y$. The qualitative logic sum inference unit 10 is constructed as shown in FIG. 5. The qualitative logic sum inference unit 10 comprises appropriate value qualitative evaluation devices 31C, 31D and a qualitative sum inference device 33, and produces a qualitative sum evaluation set $S(\partial X + \partial Y)$ of the amounts of change $\partial X$, $\partial Y$.

Figure 6:
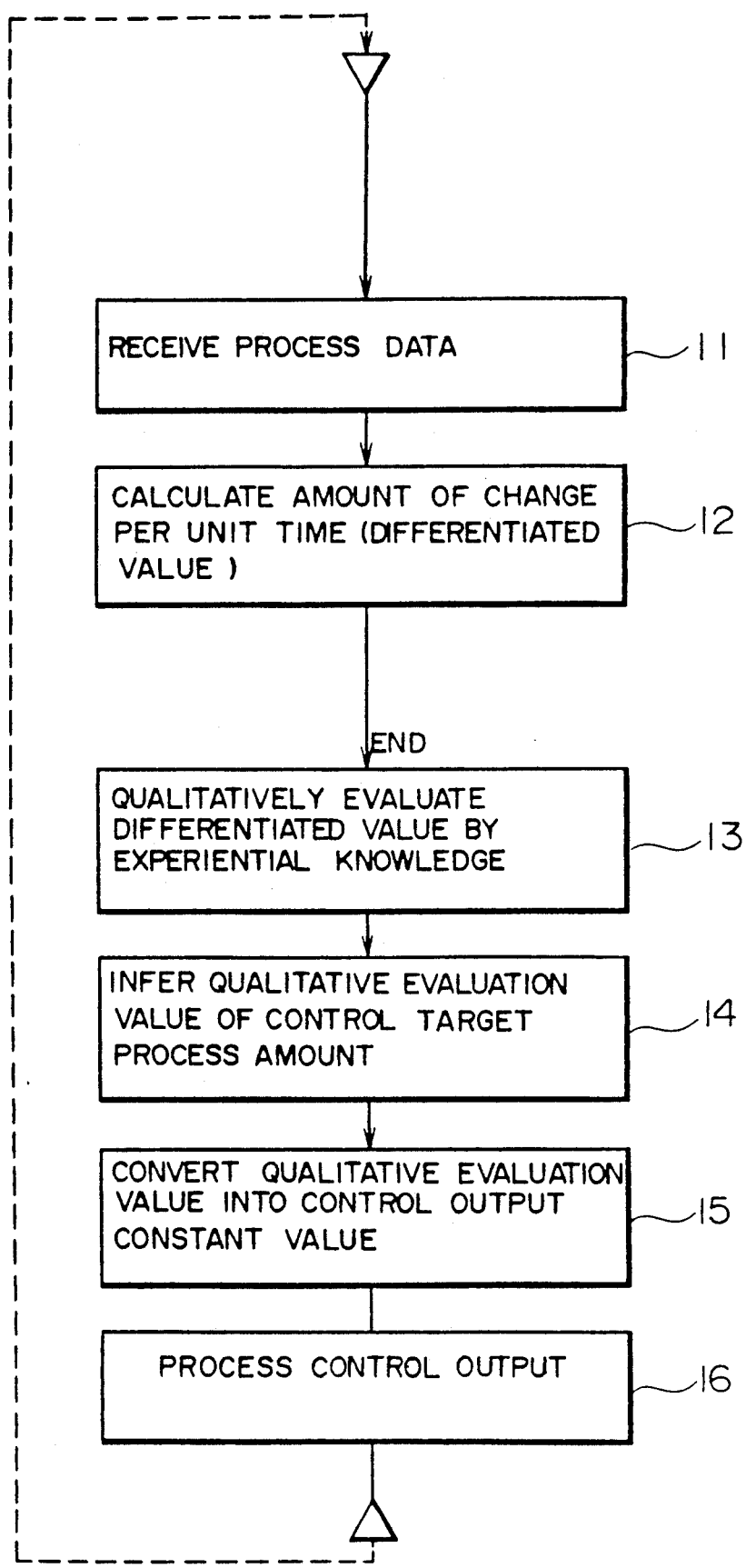
FIG. 6 is a flow chart showing the order of all operations according to this invention.

The operation will be described with reference to the flow chart of FIG. 6.

Figure 7A:
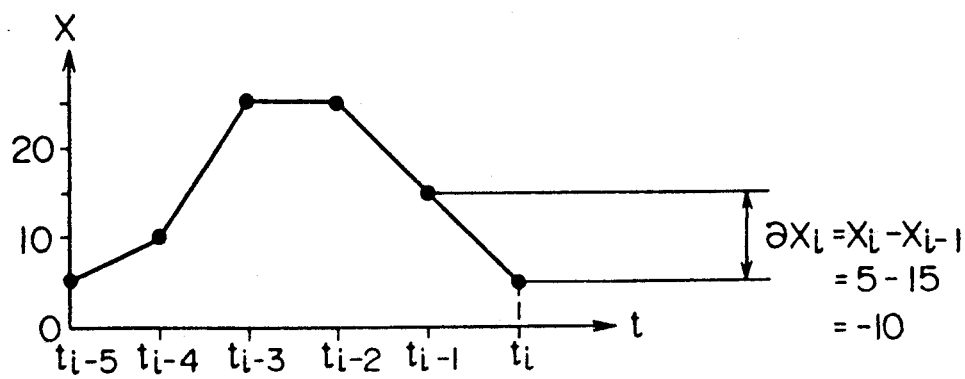

At step 11, the amounts of different processes necessary for the control are supplied to the process input apparatus 1 and processed: At step 12, the differentiation apparatus 2 calculates the amounts of change of processes per unit time which were stored at step 11. FIG. 7 graphically shows the processing in the differentiation apparatus 2. FIG. 7a shows the change of the process amount X with respect to time, in which the ordinate indicates the absolute amount of the process amount X, and abscissa is time. FIG. 7a shows, for example, that the process amount X is changed from 5 to 25 relative to time $t_{i-5}$ through time $t_i$. The present time is represented by $t_i$ and thus unit time before the present time is $t_{i-1}$. If the process amount X at time $t_i$ is denoted by $X_i$ and the amount of change is $\partial X_i$, the amount of change $\partial X_i$ is expressed by the difference between $X_i - X_{i-1}$, or $$\partial X_i = X_i - X_{i-1} \ldots \ldots \ldots \tag{1}$$

Figure 7B:
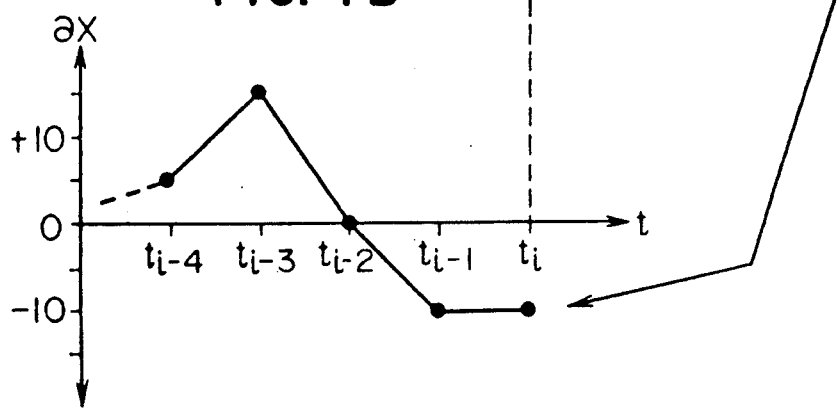
Figure 8:
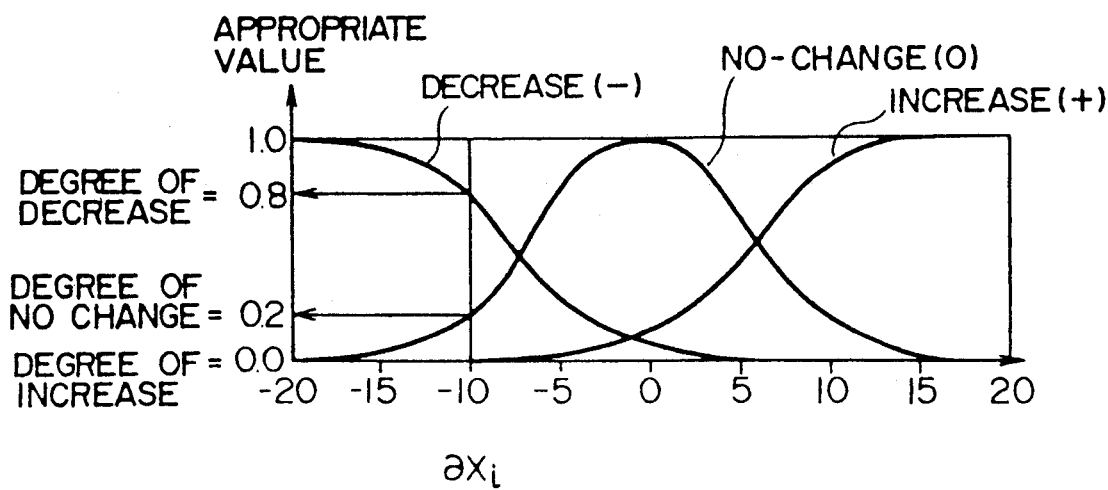
FIG. 8 shows the membership function evaluated by the fuzzy amount for the qualitative evaluation of the amount of process or the amount of change of process with respect to time.

In FIG. 7a, since $X_i = 5$, and $X_{i-1}$ is 15, the amount of change $\partial X_i$ is −10. FIG. 7b shows the transition of the amount of change $\partial X$ relative to time. In this figure, $\partial X_i$ is negative, and the process amount X is reduced by absolute amount of 10 at time $t_i$. As described above, at step 12 the amounts of change of necessary different processes per unit time are calculated to produce constant values of local change of process. Then, steps 13 and 14 follows in turn, where the qualitative inference apparatus 3 performs inference. At step 13, the appropriate value qualitative evaluation devices 31A to 31D make evaluation processing as shown in FIGS. 4 and 5. In order to evenly evaluate the amount of change of different process amounts calculated at step 12 and to infer the process change, the qualitative evaluation graph or membership function based on the emperical knowledge shown in FIG. 8 is stored in the storage 6. FIG. 8 shows the three stage evaluation of decrease (−), no change (0) and increase (+) of process amount X relative to the differentiated value (amount of change) $\partial X$. The evaluation stages may be two different stages of, for example, decrease and increase or five different stages of decrease, slight decrease, no change, slight increase, and increase. The number of stages is arbitrary depending on the density of transcendental information. In FIG. 8, the ordinate is the appropriate value defined as 0.0 to 1.0 for qualitative evaluation degree and the abscissa is the amount of change X. The range of the amount of change $\partial X$ is from −20 to 20, and when the amount of change $\partial X$ is −20, the appropriate value of decrease is 1.0. This qualitatively implies that if the process amount X is decreased by 20, the process amount X is decreased definitely. However, when the amount of change $\partial X$ is 5, the process amount is not always decreased, and thus the appropriate value of decrease is set to 0.0. When the amount of change $\partial X$ is in the range from −20 to 5, the appropriate value is set to a value between 0.0 and 1.0 because such decision as above cannot be made. Since the amount of change $\partial X_i$ shown in FIG. 7 is −10, the appropriate value is 0.8 from the intersection in the decrease evaluation graph. This evaluation is "the process amount X is decreasing at the rate of 0.8 at time $t_1$". The evaluation graph of no change is in a form of mountain in which the appropriate value is 1.0 when the amount of change $\partial X$ is around 0 and it is 0.0 when the amount of change is ±17. When the amount of change $\partial X$ is −10, the appropriate value of no change is 0.2. The evaluation graph of increase is such a form that the appropriate value is 1.0 for 20 of amount of change $\partial X$ and 0.0 for −7 of amount of change $\partial X$. When the amount of change $\partial X_i$ is −10, the appropriate value of increase is 0.0. This is not said to increase from qualitative viewpoint. As a result, the qualitative evaluation is expressed by the set, S defined by the following equation.

$$\begin{aligned} S(\partial X) &= \text{(increase appropriate value, no-change} \\ &\quad \text{appropriate value, decrease appropriate value)} \\ &= (\mu + (\partial X), \mu 0(\partial X), \mu - (\partial X)) \\ &= (0.0, 0.2, 0.8) \end{aligned} \tag{2}$$

In the equation (2), $\mu + (\partial X)$ indicates the appropriate value of increase, $\mu 0(\partial X)$ is the appropriate value of no change, and $\mu - (\partial X)$ is the appropriate value of decrease. At step 13, as described above, the differentiated value $\partial X$ is inputted and the qualitative evaluation set is produced at the output. By the processing at step 13, the appropriate values of different process amounts are evaluated evenly. At step 14, the inference processing is carried out by the qualitative product inference device 32 and the qualitative sum inference device 33. At step 14, the qualitative evaluation appropriate value set of the control target process amount after unit time $t_{i+1}$ is inferred on the basis of the qualitative evaluation set relative to the differentiated value (amount of change)

∂X of different process amounts produced at step 13 by the rule based on the transcendental information.

FIG. 9 shows the rule in the qualitative product inference. In FIG. 9, when the differentiated values (amount of change) ∂X, ∂Y of two different process amounts X, Y are inputted, the process amounts inferred from the product thereof, or the appropriate values of amounts of change ∂X, ∂Y can be found by the following way. The decrease is indicated by −, the no change by 0 and the increase by +. FIG. 9 shows the following 9 different rules made on the basis of the experience rules.

| | |
|---|---|
| (Rule 1) | if δX is − and if δY is −, then δX · δY is +. |
| (Rule 2) | if δX is − and if δY is 0, then δX · δY is 0. |
| (Rule 3) | if δX is − and if δY is +, then δX · δY is −. |
| (Rule 4) | if δX is 0 and δY is −, then δX · δY is 0. |
| (Rule 5) | if δX is 0 and δY is 0, then δX · δY is 0. |
| (Rule 6) | if δX is 0 and δY is +, then δX · δY is 0. |
| (Rule 7) | if δX is + and δY is −, then δX · δY is −. |
| (Rule 8) | if δX is + and δY is 0, then δX · δY is 0. |
| (Rule 9) | if δX is + and δY is +, then δX · δY is +. |

The rule 9, for example, can be explained by, such a qualitative way as "if the process amounts X and Y are both increasing, the process amount of product X·Y increases". The qualitative product inference device 32 carries out the above rule as follows. The evaluation sets S(∂X), S(∂Y) are expressed as, for example, $$S(\partial X) = (0.8, 0.2, 0.1)$$

$$S(\partial Y) = (0.6, 0.8, 0.0)$$

In this example, the process amount X tends to decrease, and the process amount Y is most probably not changed. The qualitative product inference device 32, when supplied with these values, carries out all the 9 different rules. For example, in the rule 9, the increase appropriate value $\mu+(\partial X \cdot \partial Y)$ of the amount of change ∂X·∂Y is the smaller one of the increase appropriate value of the amount of change ∂X and the increase appropriate value of the amount of change ∂Y. In other words, $$\begin{aligned}\mu + (\partial X \cdot \partial Y) &= \text{minimum}(\mu + (\partial X), \mu + (\partial Y)) \\ &= \text{minimum}(0.8, 0.6) \\ &= 0.6\end{aligned}$$

In the rule 1, similarly the increase appropriate value of the amount of change ∂X·∂Y is inferred. Thus, $$\begin{aligned}\mu + (\partial X \cdot \partial Y) &= \text{minimum}(\mu - (\partial X), \mu - (\partial Y)) \\ &= \text{minimum}(0.1, 0.0) \\ &= 0.0\end{aligned}$$

By employing the minimum of the change appropriate values of the differentiated values of different process amounts in each rule, it is possible to find the change of situations without error. When the 9 different rules are all executed in this way, a plurality of increase appropriate values of amount of change ∂X·∂Y are inferred. The local trend of process can be found by selecting the most appropriate value from the plurality of inferred results. Thus, the increase appropriate value of the amount of change ∂X·∂Y is the appropriate value, 0.6 inferred by rule 9. This means that the amount of change ∂X·∂Y is decided to be "considerable increase" by the experiential observation of the process action from the two different viewpoints. The rule 9 is useful to infer that when two different measured values X, Y both increase, the amount of change ∂X·∂Y increases, while the rule 1 can infer that when two different measured values X, Y both decrease, the amount of change ∂X·∂Y increases. In this way, the qualitative evaluation set S(∂X·∂Y) of the amount of change ∂X·∂Y is produced from the qualitative logic product inference apparatus 9.

FIG. 10 shows the inference rules which the qualitative sum inference device 32 carries out. This qualitative sum inference apparatus 33 is different from the qualitative product inference device 32 in rules. The operations performed in accordance with the rules are the same. The reason why the qualitative logic product inference apparatus 9 and the qualitative logic sum inference apparatus 10 are separately provided is that the qualitative differential equation which simulates the transition of the process state is determined by the qualitative logic sum and qualitative logic product of the differentiated values of different process amounts. Thus, either apparatus may be used depending on the process.

The amount of change ∂a of the control target process amount a after unit time is determined by the differentiated values of different process amounts A, B, C and expressed by the following qualitative differential equation.

$$\partial a = \partial A \cdot \partial B + C \ldots \ldots \quad (3)$$

In equation (3), dot "·" indicate the qualitative product and "+" indicates the qualitative sum. The equation (3) can be explained qualitatively as "the rate ∂a of change of the process amount a after unit time is determined by the sum of the product of the rate of change ∂A of the process amount A and the rate of change ∂B of the process amount B, and the rate ∂C of change of the process amount C". The "rate of change" is indicated by the qualitative evaluation appropriate value or the set. Thus, the qualitative inference apparatus 3 comprises the qualitative logic product inference apparatus 9 which receives ∂A and ∂B and produces the qualitative product evaluation set S(∂A·∂B) of ∂A·∂B and the qualitative logic sum inference apparatus 10 which receives S(∂A·∂B) and ∂C. The qualitative inference apparatus produces the qualitative evaluation set of the rate of change of the control target process amount a after unit time, or S(∂A·∂B+∂C).

Figure 11:
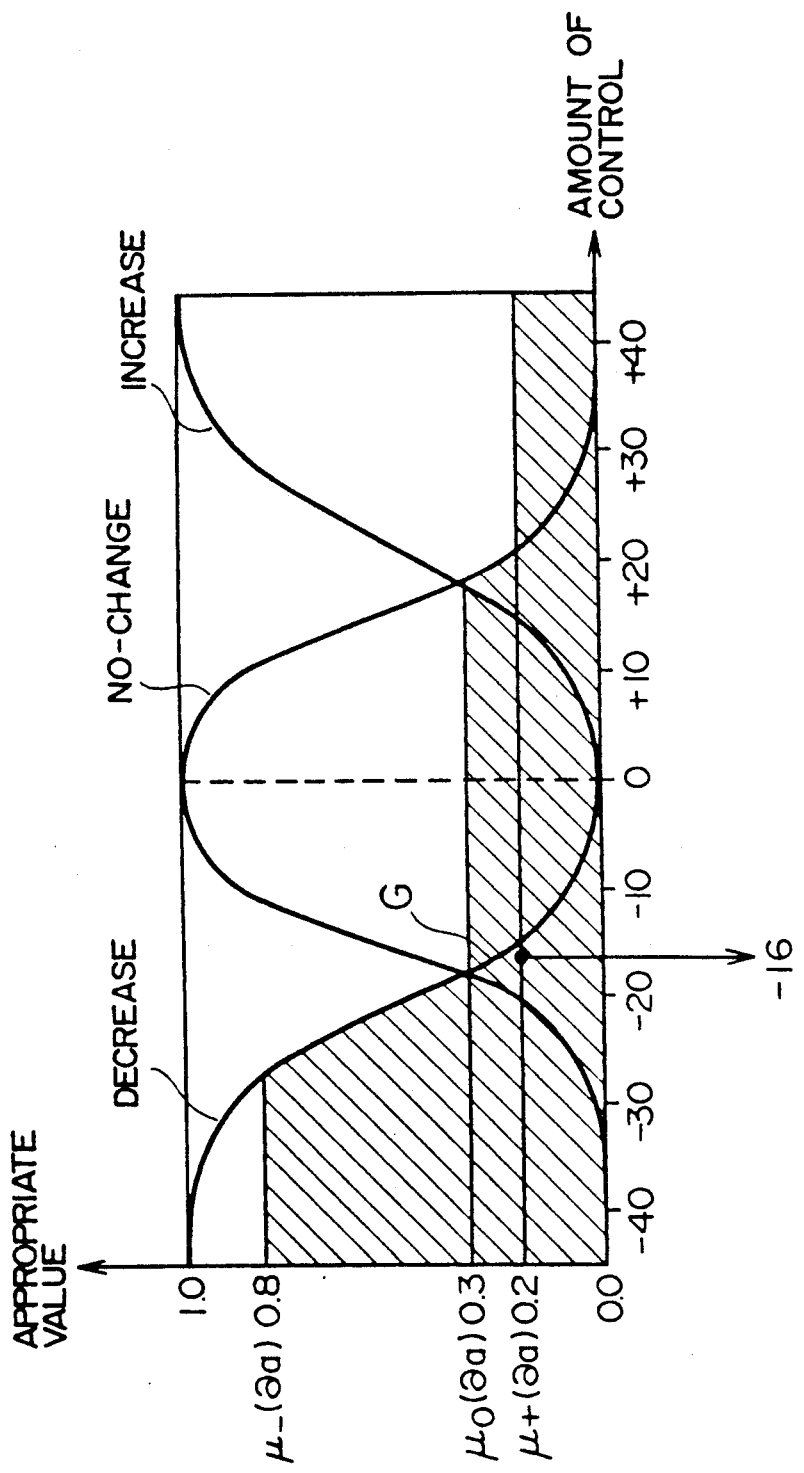
FIG. 11 is a graph showing the control operation amount conversion characteristics of centroid arithmetic apparatus.

Then, at step 15 the amount of control is determined by the centroid arithmetic apparatus 4. The centroid arithmetic apparatus 4 receives the qualitative evaluation set inferred by the qualitative inference apparatus 3, and determines the amount of control on the basis of the transcendental information thereto. FIG. 11 shows the evaluation graph (membership function) of the amounts of control produced on the basis of experiential knowledge. In FIG. 11, the amount of increase and decrease from the present amount of control, or the amount of control is evaluated qualitatively. In FIG. 11, the ordinate indicates the appropriate values in the range from 0.0 to 1.0 and the abscissa is the amount of control. The amount of control is evaluated in three stages of decrease, no change and increase. In FIG. 11, the evaluation of "decrease" is the monotonous decrease type in which the appropriate value is 1.0 for amount of control of −40 and 0.0 for amount of control of −8, the evaluation of "no change" is the mountain type in which the appropriate value is 1.0 for the amount of control of 0 and 0.0 for the amount of control of −30 and +30, and the evaluation of "increase" is the monotonous increase type in which the appropriate value is 1.0 for the amount of control of 40 and 0.0 for the amount of control of 8. The centroid arithmetic apparatus 4 refers to the control amount evaluation graph, shown in FIG. 11, stored in the storage 6 and determines the amount of control as follows. The qualitative evaluation appropriate value set $S(\partial a)$ of the control target process amount after unit time calculated at step 14 is expressed as $$S(\partial a) = (\mu - (\partial a), \mu 0(\partial a), \mu 0 + (\partial a))$$
$$= (0.8, 0.3, 0.2)$$

Each value of this set is employed as the evaluation to the respective amount of control, and as shown in FIG. 11, the area surrounded by each evaluation graph curve, appropriate values 0.0, 1.0, and control amounts −45, +45 is cut by each appropriate evaluation straight line. Thus, the shaded effective evaluation area can be obtained as illustrated. This shaded area indicates the degree of effectiveness in each evaluation stage. The centroid arithmetic apparatus 4 calculates the centroid G having the same mass as that of the shaded area, and the coordinate of the centroid G relative to the control amount axis. In this example, it is −16. This value is the amount of control operation. The above processing can be explained qualitatively as "since the control target process amount a is most probably decreased after unit time, the amount of control should be decreased by 16 from the present value". In this way, at step 15 the amount of control operation is determined by the qualitative evaluation value of the control target process amount after unit time.

At step 16, the amount of control operation determined as above is supplied to the process.

A sequence of the processings is repeated at every unit time which is determined by the time constant of the process to be controlled, so as to control the process.

Thus, according to this invention, since different process amounts or the amounts of change thereof with respect to time are evaluated qualitatively by transcendental information and since the qualitative evaluation values of the control target process amount after unit time are inferred by the rules based on the transcendental information from the evaluation information, it is possible to make control in good response to the local change of process.

Moreover, since different process amounts or the amounts of change are qualitatively evaluated as increase, no change and decrease and the rate, or probability thereof is determined in the range from 0.0 to 1.0 and used for the determination of the amount of control operation, the amounts of control are not extreme values, resulting in increase of reliability.

FIG. 12 shows characteristic curves useful for explaining the effect of this invention.

FIG. 12a shows the transition of the control target process amount a relative to time. The amount of change $\partial a$ of the process amount a unit time $t_{i+1}$ after the present time $t_i$ is determined by the amounts of change of different process amounts A, B at time $t_i$ as described above.

FIG. 12b shows the transition of the process amount A relative to time. FIG. 12c shows the transition of the amount of change per unit time $\partial A$ of the process amount A relative to time, FIG. 12d shows the transition of the process amount B relative to time, and FIG. 12e shows the transition of the amount of change per unit $\partial B$ time of the process amount B relative to time.

In the conventional prediction-based method using the method of least squares, the process amounts A, B are both predicted to increase from the observation of the past time-sequential data as indicated by the crosses small circles with cross $\bigotimes$ in FIG. 12. Thus, the control target process amount a is also predicted to increase after unit time $t_{i+1}$ as indicated by the small circles with cross $\bigotimes$. However, at time $t_i$ the process amount B is suddenly decreased and the actual control target process amount a is indicated by double small circles $\bigodot$. In this invention, since the amount of change $\partial A$ of the process amount A, and since the amount of change $\partial B$ of the process amount B are evaluated qualitatively and the change of the process amount a is inferred by the experiential rules, the prediction as indicated by the double small circles can be achieved. Thus, the amount of control operation can be correctly determined. As a result, the control can follow the local sudden change. The number of processes is of course not limited to two.

Figure 13:
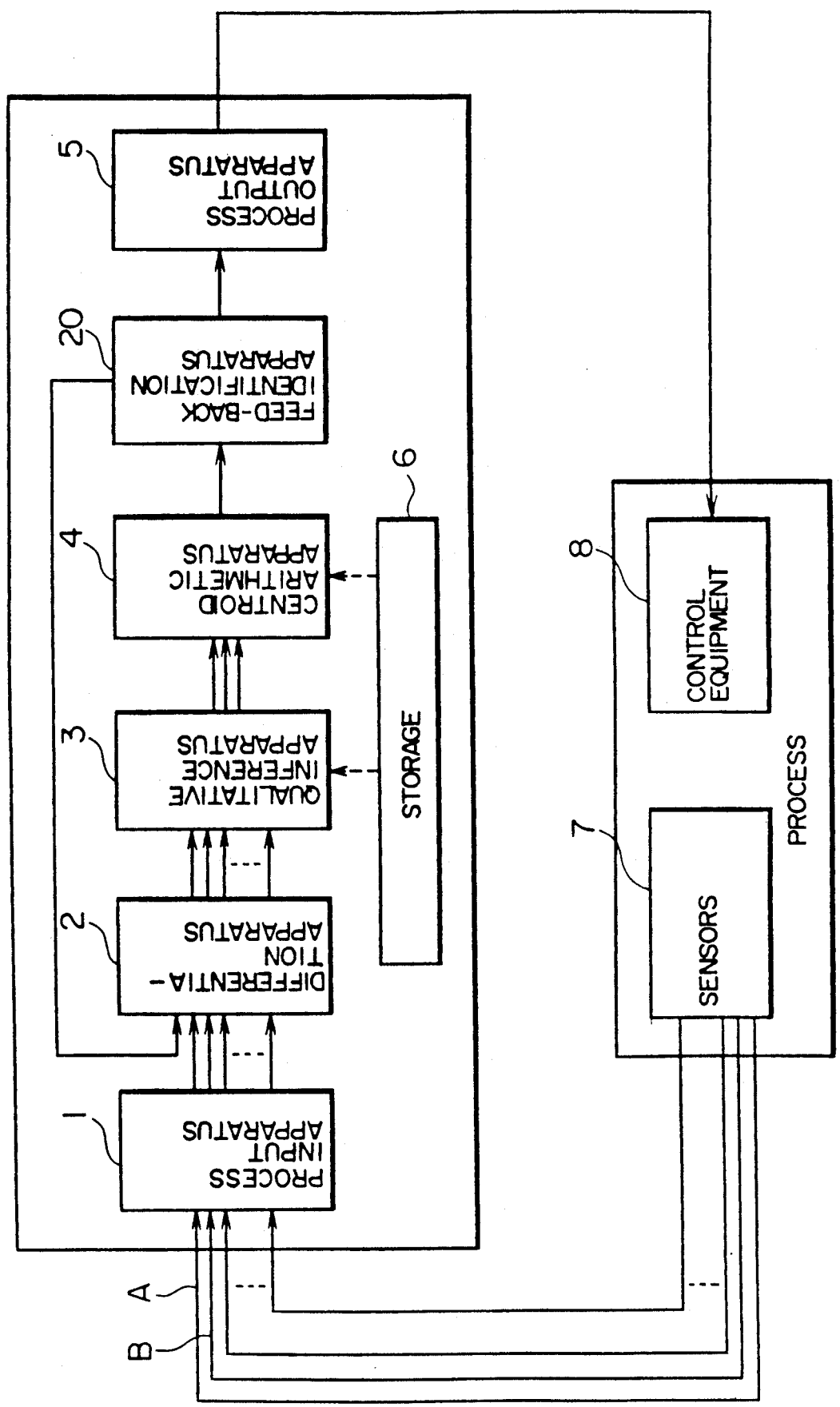
FIG. 13 is a block diagram of another embodiment of this invention.

FIG. 13 shows another embodiment of this invention. The embodiment in FIG. 13 is different from that in FIG. 1 in that the feedback identification apparatus 20 is provided. The contents to be processed in the centroid arithmetic apparatus 4 are also somewhat changed. The feature of the embodiment of FIG. 13 is that the amount of control is fed back to repeat a sequence of processings until the control target process amount a inferred is within the control target allowable range. The same processing as in the embodiment shown in FIG. 1 is performed to calculate the amount-of-change qualitative evaluation set of the control target process amount. The centroid arithmetic apparatus 4 determines the amount of control operation and the amount of change of the control target process from the transcendental information.

Figure 14:
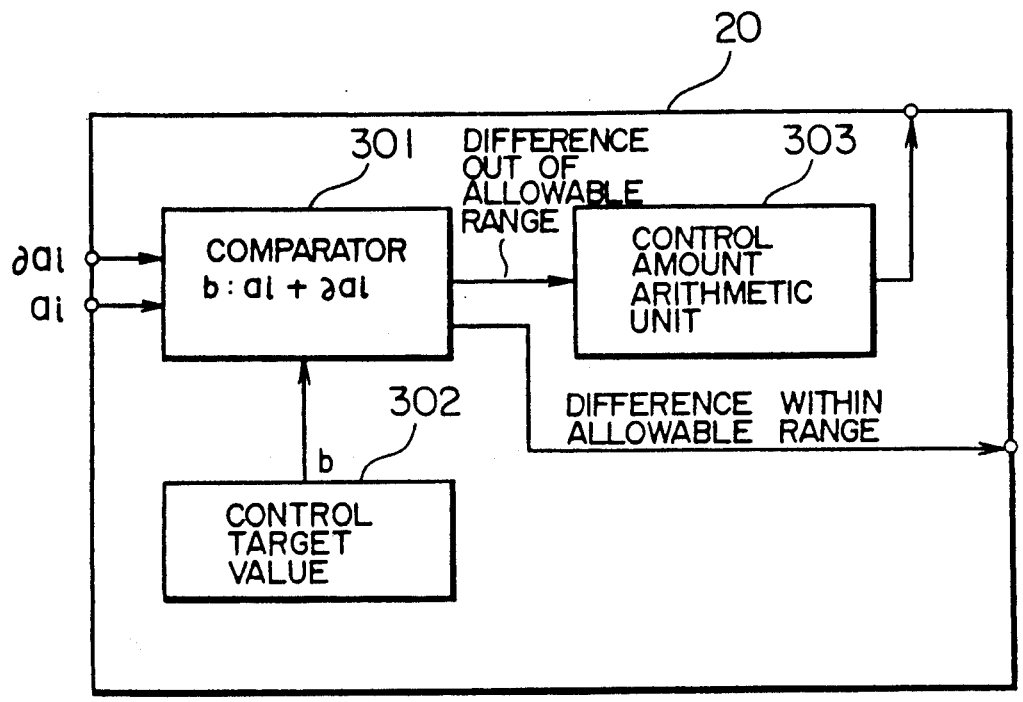
FIG. 14 is a detailed diagram of the identification apparatus in FIG. 13.
Figure 15:
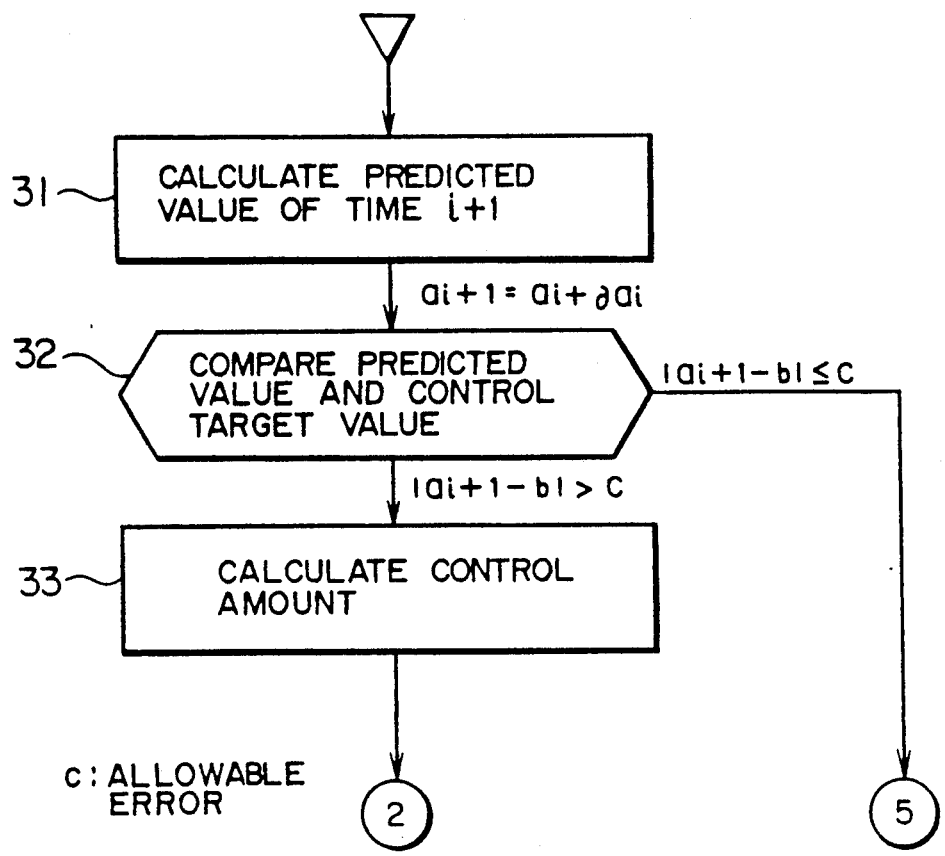
FIG. 15 is a flow chart for the operation of FIG. 3.

FIG. 14 shows the construction of the feedback identification apparatus 20. The feedback identification apparatus 20 receives the amount of displacement $\partial a_i$ of the control target information a predicted at time i and absolute amount $a_i$ at time i from the centroid arithmetic apparatus 4. A comparator 301 adds $a_i$ and $\partial a_i$ to calculate a predicted absolute value and compares it with the control target value b. If the difference is smaller than the allowable error C, or much satisfactory, the comparator actuates the process output apparatus 5, and produces the absolute value as a control amount to the control equipment. If the absolute value of difference between the predicted value and the control target value b is larger than the allowable error, or the amount of control is necessary to be reconsidered, a control amount arithmetic unit 303 is actuated. The unit 303 calculate the amount of control relative to the difference and replaces the amount of operation of the control equipment supplied from the process by this value, thereby actuating the differentiation apparatus 2 recurrently. FIG. 15 shows a flow chart of the above operations.

Thus, a sequence of processings is repeated until the control target process amount is within the control target allowable range, so as to predict with high precision.

Figure 16:
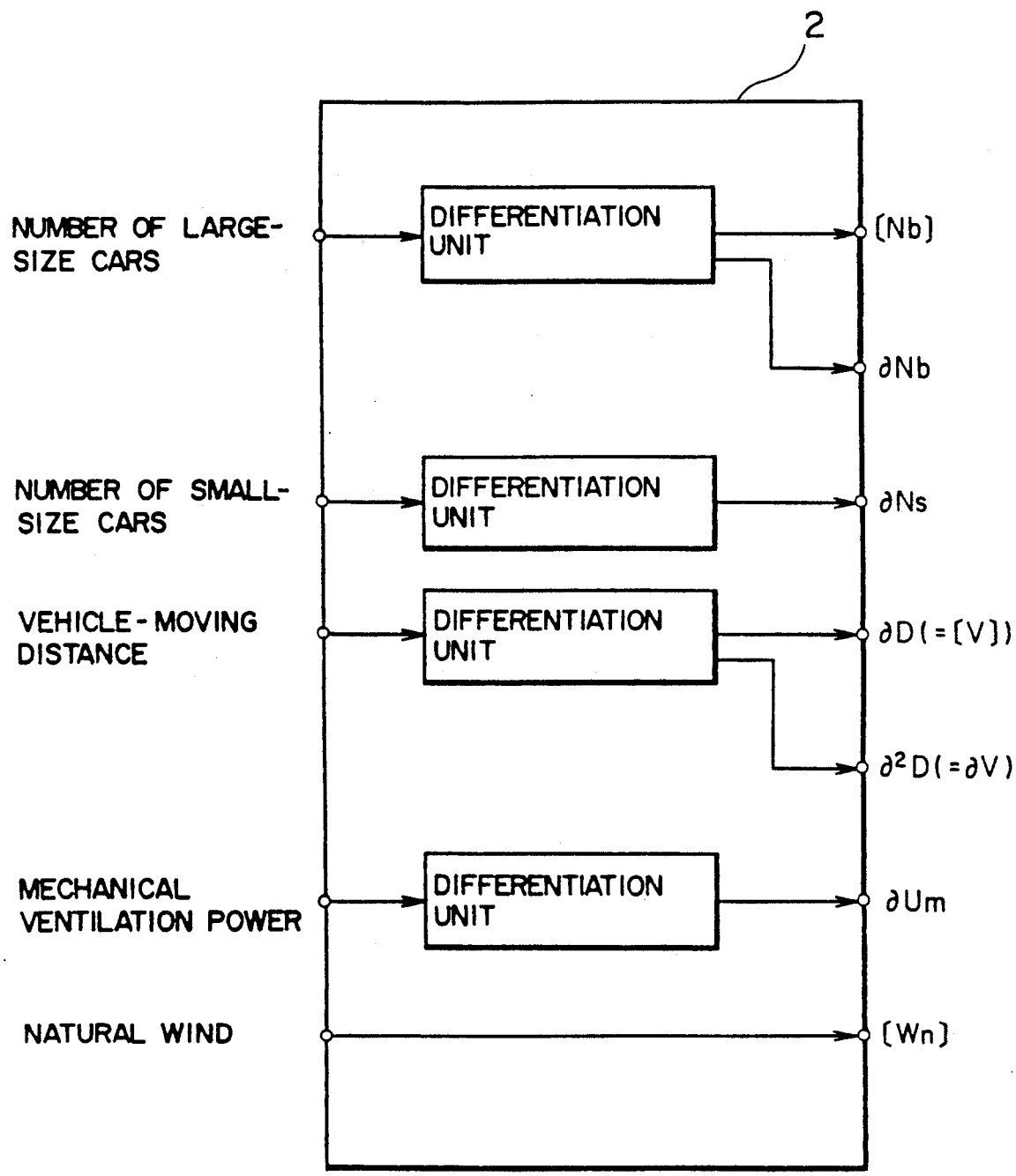
Figure 17:
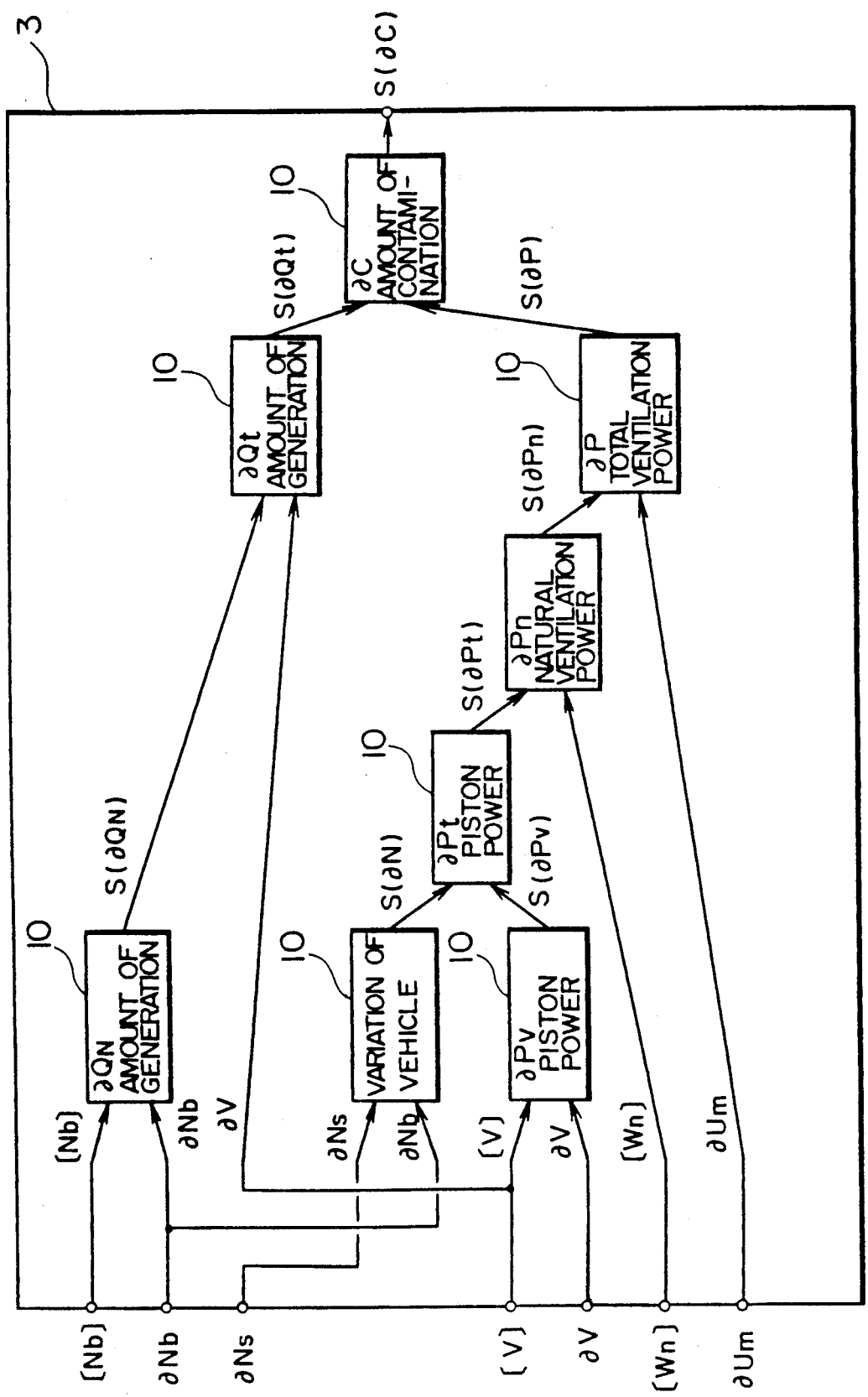
Figure 18A:
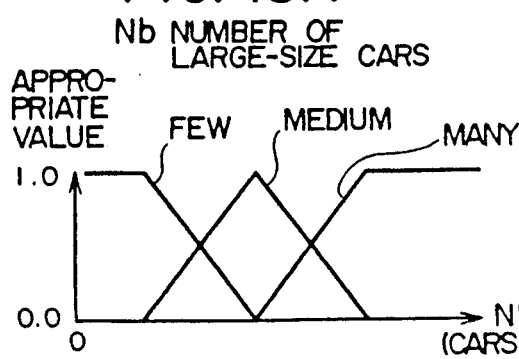
FIGS. 18A-G shows the membership function relative to qualitative variable of process.
Figure 18B:
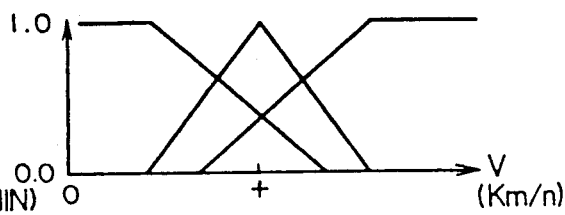
Figure 18C:
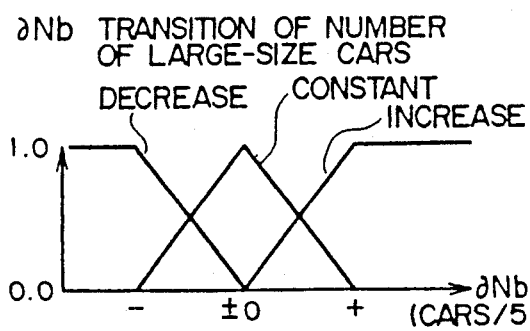
Figure 18D:
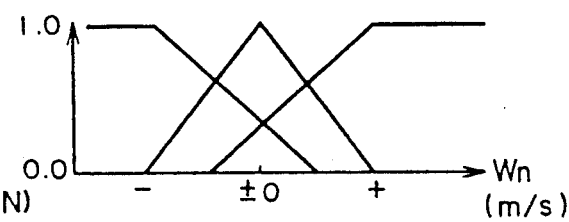
Figure 18E:
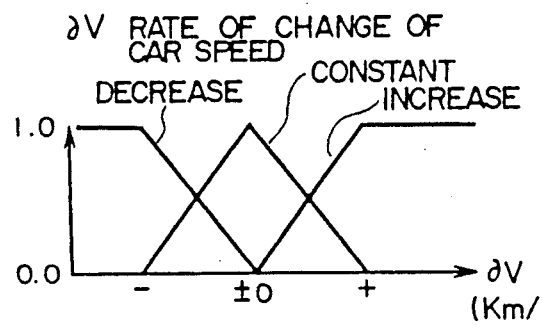
Figure 18F:
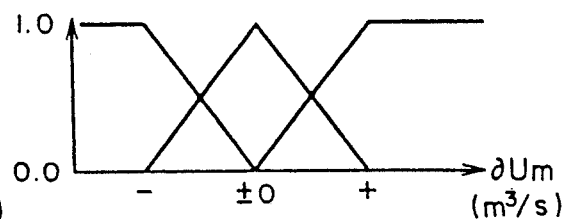
Figure 18G:
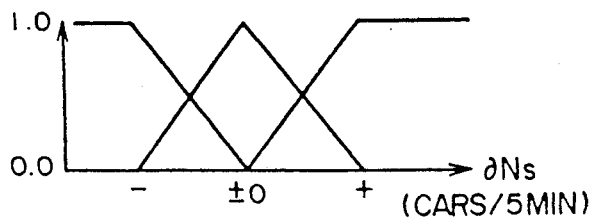

FIGS. 16 and 17 show still another embodiment for the application to the pollution predicting system within a road tunnel.

The factors for determining the degree of the pollution within the tunnel are physically the number of vehicles, the ratio of large-sized cars to vehicles, speed of cars, natural wind and mechanical ventilation power of ventilator such as jet fan. If the amount of pollution generated from time t to time t+1 is represented by $\partial C$, this process can be expressed by the following qualitative differential equation.

$$\partial C = (([N_b] + \partial N_b) + [V]) + \\ \{((\partial N_s + \partial N_b) + ([V] + \partial V)) + [W_n]\} + \partial U_m \quad (4)$$

where

C: amount of pollution
$N_b$: number of large-sized cars per 5 minutes
$N_s$: number of small-sized cars per 5 minutes
V: speed of car (Km/hour)
$W_n$: natural wind m/s
$U_m$: mechanical ventilation power (m³/s)

In this system built by using the construction of FIG. 1 according to this invention, the differential apparatus 2 and the qualitative inference apparatus 3 are shown in FIGS. 16 and 17, respectively.

The differential apparatus 2 receives $N_b$, $N_s$, D, $U_m$, $W_n$ from the sensors of the process and produces qualitative variables included in the equation (4). In other words, it produces absolute amounts $N_b$, $W_n$, first-order differentiated values $\partial N_b$, $\partial N_s$, $\partial D(=V)$, $\partial U_m$, second-order differentiated values $\partial^2 D(=\partial V)$.

The qualitative inference apparatus 3 receives the membership function to each qualitative variable, from the storage 6 and the above-given qualitative variables as shown in FIGS. 18A–G and infers qualitatively in accordance with the equation (4). The inference is made in steps and finally the appropriate degree set S ($\partial C$) of $\partial C$ is produced. Although the elements of the equation (4) are absolutely different in unit from the physical standpoint, this system is able to make total prediction.

Figure 19B:
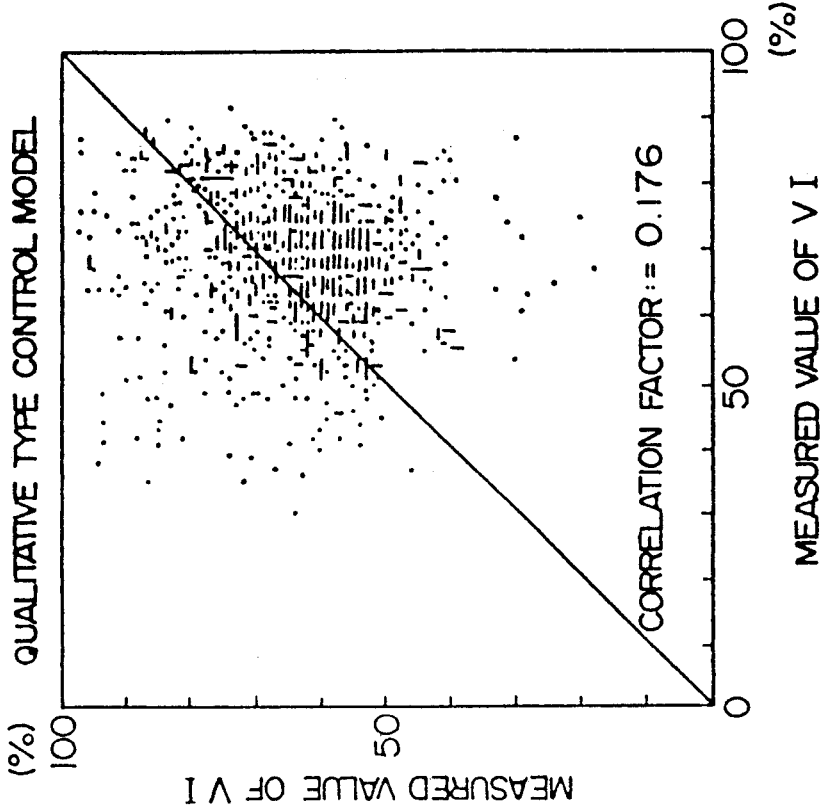
FIGS. 19A-B shows graphs illustrating characteristics for explaining the effects of this embodiment.
Figure 19A:
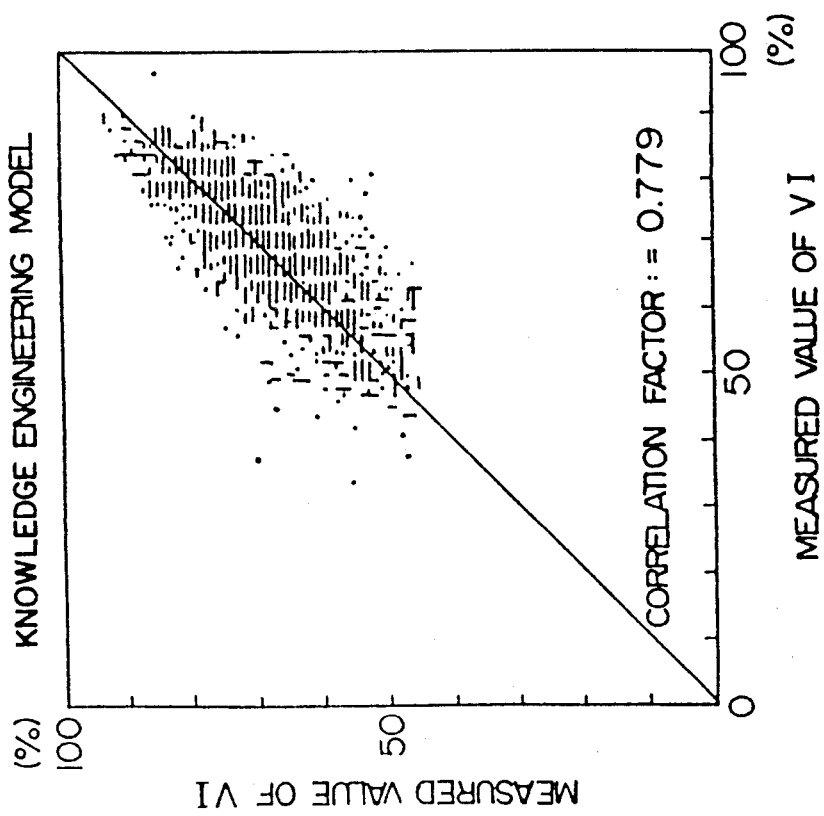

FIGS. 19A–B shows the control by the conventional quantitative type model and the control by the invention using fuzzy for the comparison therebetween. The control in both system is the predicted situations of the pollution value of the air within a tunnel. The abscissa is the measured pollution value VI, and the ordinate is the predicted value obtained by each control system. From FIGS. 19A–B it will be seen that the conventional model has a wide distribution, while the system of this invention provides extremely excellent correlation and high-precision prediction.

Thus, according to this invention, since the amounts of change of different process amounts per unit time are qualitatively evaluated from transcendental information and the probability of change of the control target process amount after unit time is inferred by the rules based on the transcendental information from the evaluated information this system can make control to satisfactorily follow the local change of process.

We claim:

1. A process control system for controlling a process, comprising:

differentiation means for receiving different kinds of process information from process sensors which measure different variables of a process and calculating amounts of change of said process information with respect to time;

qualitative evaluation means, connected to said differentiation means, for evaluating in evaluation stages said process information or said amounts of change of said process information with respect to time by a membership function previously determined as having fuzzy amounts;

qualitative inference means, connected to said qualitative evaluation means, for inferring a qualitative evaluation value set of control target process information after a unit of time by experiential rules on the basis of combinations of values in each of said evaluation stages;

centroid arithmetic means, connected to said qualitative inference means, for receiving said qualitative evaluation value set inferred by said qualitative inference means and determining an amount of control of said control target process information by centroid arithmetic processing of said membership function; and output means, connected to said centroid arithmetic means, for supplying said amount of control determined by said centroid arithmetic means to said process, thereby causing a change in operation of said process according to said amount of control.

2. A process control system according to claim 1, wherein said differentiation means has a plurality of differentiation units and memories for storing previously differentiated values connected in cascade and produces arbitrary-order amount of change of process amount with respect to time.

3. A process control system according to claim 1, wherein said qualitative inference means has a qualitative logic product inference unit which assigns qualitative logic product rules made by experimental knowledge to said combinations of said values in each of said evaluation stages which are obtained by qualitatively evaluating said process information or said amount of change of said process information with respect to time, and infers a qualitative logic product evaluation set of said control target process information.

4. A process control system according to claim 1, wherein said qualitative inference means has a qualitative logic sum inference unit which assigns qualitative logic sum rules obtained by experiential knowledge to said combinations of said values in each of said evaluation stages which are obtained by qualitatively evaluating said process information or said amount of change of said process information with respect to time, and infers a qualitative logic sum evaluation set of said control target process information.

5. A process control system according to claim 1, wherein when values of said qualitative evaluation value set of said control target process information are determined by a qualitative logic sum of said process information or differentiated values thereof and a qualitative logic product thereof, said qualitative inference means includes a qualitative logic product inference unit which assigns qualitative logic product rules to experiential rules and infers a qualitative logic product evaluation set, and a qualitative logic sum inference unit which assigns qualitative logic sum rules to said experiential rules and infers a qualitative logic sum evaluation set, said qualitative inference means combines said qualitative logic product evaluation set and said qualitative logic sum evaluation set to thereby infer a qualitative evaluation value set of said control target process information.

6. A process control system for controlling a process, comprising:
- process input means for receiving different kinds of process information from process sensors which measure different variables of said process;
- differentiation means for receiving said process information from said process input means and determining amounts of change of said process information with respect to time;
- qualitative evaluation inference means for receiving said process information and said amounts of change of said process information and inferring a qualitative evaluation value set of control target process information;
- centroid arithmetic means for receiving said qualitative evaluation value set inferred by said qualitative evaluation inference means and determining an amount of control of control target process information to be supplied to said process;
- process output means for supplying said amount of control determined b said centroid arithmetic means to said process, thereby causing a change in operation of said process according to said amount of control; and
- feed-back identification means, provided between said centroid arithmetic means and said process output means, for repetitively processing a change in said amount of control until said control target process information enters within an allowable range of control target process information values and feeding said amount of control back to said process input means.

7. A process control method in a process control system for controlling a process by using a relationship between a qualitative logic sum and a qualitative logic product to obtain control target process information amounts based on inputted process information amounts, said process information amounts being measured by a plurality of sensors included in said process control system, said method comprising the steps of:
- inputting a plurality of process information amounts measured by said sensors;
- determining a variation amount by differentiating each of said process information amounts measured by said sensors;
- determining a qualitative evaluation value by evaluating said variation amount based on a membership function previously determined, said membership function having fuzzy amounts corresponding to measures of process information amounts;
- previously preparing an inference rule selected from a qualitative logic sum and a qualitative logic product by use of an experimental rule which is based on said relationship between said qualitative logic sum and said qualitative logic product, and inferring a qualitative evaluation value indicative of a magnitude of the variation amount after a unit of time for control target process information;
- converting the inferred qualitative evaluation value into a constant amount and determining a control amount of said process control system based on said constant amount; and
- outputting said control amount to said process, thereby causing a change in operation of said process according to said control amount.

* * * * *